United States Patent
Ueda et al.

(10) Patent No.: US 7,350,379 B2
(45) Date of Patent: Apr. 1, 2008

(54) QUALITY CONTROL METHOD AND QUALITY CONTROL APPARATUS FOR GLASS GOB IN THE FORMATION OF A GLASS PRODUCT

(75) Inventors: Mitsuo Ueda, Hyogo (JP); Melvin Lim Si, Hyogo (JP); Kenichi Gomyo, Osaka (JP); Satoshi Sugimoto, Osaka (JP)

(73) Assignee: Nihon Yamamura Glass Co., Ltd., Hyogo (JP)

( * ) Notice: Subject to any disclaimer, the term of this patent is extended or adjusted under 35 U.S.C. 154(b) by 582 days.

(21) Appl. No.: 10/483,196

(22) PCT Filed: Jul. 19, 2002

(86) PCT No.: PCT/JP02/07367

§ 371 (c)(1),
(2), (4) Date: Jan. 8, 2004

(87) PCT Pub. No.: WO03/008348

PCT Pub. Date: Jan. 30, 2003

(65) Prior Publication Data

US 2004/0194506 A1    Oct. 7, 2004

(30) Foreign Application Priority Data

Jul. 19, 2001    (JP) .............................. 2001-218893

(51) Int. Cl.
C03B 9/41     (2006.01)
C03B 18/20    (2006.01)
H04N 7/18     (2006.01)

(52) U.S. Cl. .................... 65/29.11; 65/29.12; 65/29.14; 65/158; 348/92; 348/135

(58) Field of Classification Search ............... 65/29.11, 65/29.12, 29.14, 29.18, 158
See application file for complete search history.

(56) References Cited

U.S. PATENT DOCUMENTS 3,486,875 A * 12/1969 Pymm ......................... 65/158

(Continued)

FOREIGN PATENT DOCUMENTS

JP    7-33445 A    2/1995

OTHER PUBLICATIONS

JP 11-118438 English language Abstract, Apr. 1999.

(Continued)

*Primary Examiner*—Russell J. Kemmerle
(74) *Attorney, Agent, or Firm*—Wood Phillips Katz Clark & Mortimer

(57) ABSTRACT

The present invention provides a quality control method and a quality control apparatus for use in the formation of a glass product. A feeder mechanism cuts a column-like molten glass pushed out through an orifice thereof into a glass gob and allows each glass gob to fall with gravity from the orifice. A predetermined glass product is formed from the glass gob after delivering the fallen glass gob to a predetermined position. According to the present invention, the glass gob produced by the feeder mechanism is observed by a plurality of optical observing means spaced apart from each other during a falling process of the glass gob, and three-dimensional coordinates data of the entire surface of the glass gob is generated. Measurement data relating to at least one of a volume, a weight, a surface shape, a length, a thickness, an angle in a falling direction, and a cut surface shape of the glass gob is produced based on the three-dimensional coordinates data. The presence or absence of a defect in the quality of the glass gob is detected by comparing the measurement data with quality standard data of a normal glass gob. A causal relationship between at least one of the operational factors of the feeder mechanism and the quality defect is determined depending on the type of quality defect identified.

2 Claims, 4 Drawing Sheets

U.S. PATENT DOCUMENTS

| | | | |
|---|---|---|---|
| 4,205,973 A | | 6/1980 | Ryan |
| 4,708,729 A | * | 11/1987 | Cardenas-Franco et al. .. 65/164 |
| 5,170,438 A | * | 12/1992 | Anger et al. ................. 382/100 |
| 5,434,616 A | * | 7/1995 | Anger et al. .................. 348/92 |
| 5,499,055 A | * | 3/1996 | Anger et al. .................. 348/92 |
| 6,205,237 B1 | * | 3/2001 | Focke et al. ................. 382/141 |
| 6,959,108 B1 | * | 10/2005 | Bartelt et al. ............... 382/141 |

FOREIGN PATENT DOCUMENTS

| | | |
|---|---|---|
| JP | 10-182168 A | 7/1998 |
| JP | 11-118438 A | 4/1999 |
| JP | 11-160021 A | 6/1999 |
| JP | 2000-284828 A | 10/2000 |

OTHER PUBLICATIONS

JP 11-160021 English language Abstract, Jun. 1999.

JP 7-33445 English language Abstract, Feb. 1995.

JP 10-182168 English language Abstract, Jul. 1998.

JP 2000-284828 English language Abstract, Oct. 2000.

* cited by examiner

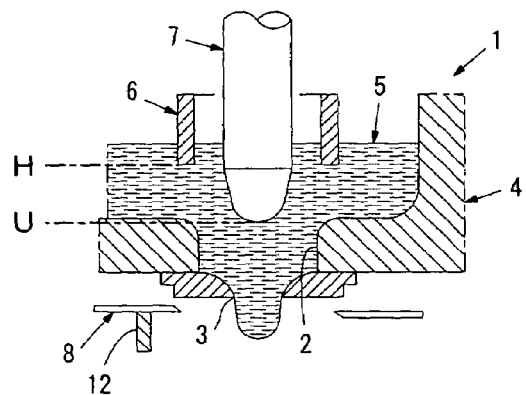
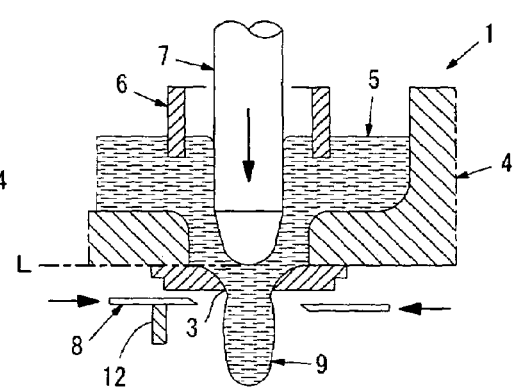
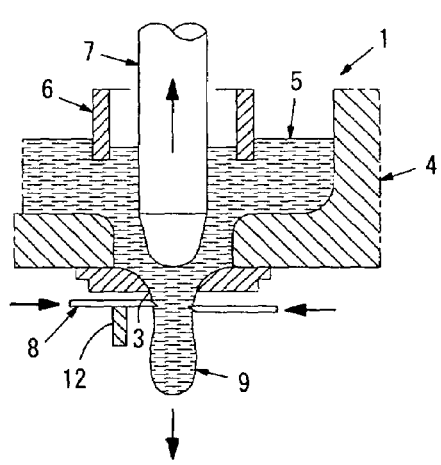
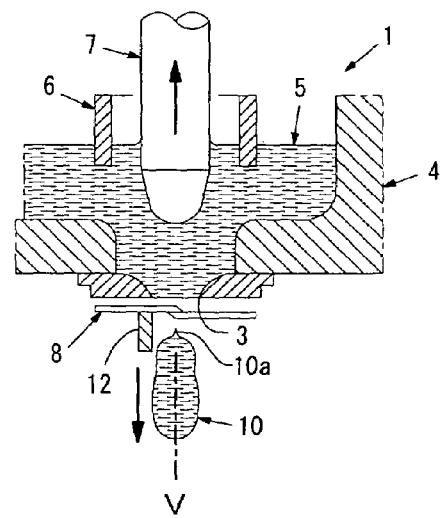

QUALITY CONTROL METHOD AND QUALITY CONTROL APPARATUS FOR GLASS GOB IN THE FORMATION OF A GLASS PRODUCT

This application is an application filed under 35 U.S.C. Sec. 371 as a national stage of international application PCT/JP02/07367, which was filed Jul. 19, 2002.

TECHNICAL FIELD

The present invention relates to a quality control method for a glass gob in the formation of a glass product, and an apparatus for performing the quality control method.

BACKGROUND OF THE INVENTION

In the manufacture of glass bottles for example, glass gobs, namely, lumps of molten glass at a temperature within a range from 1100° C. to 1200° C. produced by a feeder mechanism, are introduced into a mold to form a predetermined bottle shape. When a glass bottle is formed from the glass gob, a hollow glass body (a parison) having a bottle opening is formed from the glass gob in a blank mold. A glass bottle as a final product is then produced from the parison in a finishing mold. Conventionally used in a blank molding step are two methods, namely, a blow method for blowing compressed air, and a press method for inserting a plunger. The finishing step typically uses only a blow method for expanding the parison by compressed air.

The quality control of the glass gob is extremely important in the production technique of the glass product. The shape and volume (weight) of the glass gob, in particular, greatly affect the quality, capacity and thickness of the glass product. If the shape and weight of the glass gob is not managed nor controlled with a repeatability, the thickness of the glass product is not stabilized. This means that variations in the quality of the glass products become large, possibly causing wrinkles as well as chill marks or checks (cracks on the surface) on the external surface of the glass product.

In a known technique, the weight of the glass product is manually measured by using an electronic balance, or it is measured by referencing the pressing depth of a machine plunger in a blank molding step in the press method. The measurement results are then fed back in the formation process of the glass gob. The quality control based on the manual process not only requires a complex procedure, but also leads to variations in the measurement from person to person. Quality control cannot be performed with precision. No information concerning the shape of the glass gob is available even if the finished glass product is carefully examined. If any faulty state of an operational factor resulting in a quality defect is detected, a faulty product has already been yielded. In any case, the quality of the glass gob must be recovered by suspending the production of the glass product so that the productivity and yield of the glass products are adversely affected.

A variety of proposals have been made as a method to control the quality of the volume (weight) and the shape of the glass gob, but each of those proposals has the following drawbacks.

(1) A method of monitoring the shape of the glass gob by a single CCD camera or the like may be proposed. With the single camera, only a side of the glass gob is observed to form a two-dimensional image. It is not easy to know the entire configuration and the volume (weight) of the glass gob.

(2) Another method may be proposed in which a glass gob formed by a feeder mechanism is placed on a measurement tray, a plurality of CCD cameras or the like are used to observe the glass gob on the tray, and the volume and the configuration of the glass gob are observed by a three-dimensional image processing technique. However, the shape of a portion of the glass gob in contact with the measurement tray is not observed. The glass gob is deformed and loses the original shape thereof as the molten glass cools with time. Further, the glass gob is possibly deformed in shape with its weight on the measurement tray. The true configuration of the glass gob cannot be known.

(3) A further method may be proposed in which a glass gob after pushed out through an orifice of the feeder mechanism, still suspended to the feeder immediately prior to a cutting operation by shear blades or in the middle of the cutting operation, is observed by a plurality of CCD cameras or the like, and the volume and the configuration of the glass gob are observed by a three-dimensional image processing technique. However, the configuration of the glass gob prior to being cut is different from the configuration of the actually cut glass gob. The weight and the shape of the glass gob as desired cannot be measured with precision. A faulty state of an operational factor functioning as a cause for a quality defect cannot be detected. If an adjustment error, for example, occurs in a drop guide that is provided for guiding the glass gob so as not to be tilted at the cutting operation, the glass gob falling subsequent to the cutting operation takes an inclined posture and may not be received by a scoop funnel in the right position thereof. Even if the glass gob is observed prior to the cutting operation, any faulty operational factors cannot be detected. If a poor cutting operation occurs because of wear of the shear blades or an insufficiently cooled shear blades, the cut surface of the glass gob is deformed, and the quality of the glass product formed in the next step is adversely affected. Such faults included in the shear blades cannot be detected even if the glass gob is observed prior to the cutting operation.

BRIEF SUMMARY OF THE INVENTION

To overcome the above-referenced drawbacks, in accordance with the present invention, a glass gob, which is falling with the gravity thereof subsequent to its formation and cut by a gob feeder, is observed by a plurality of optical observing means so that three-dimensional coordinates data relating to the entire surface of the falling glass gob is produced.

The glass gob falling in air takes a natural original shape and accounts for all the operational conditions of the gob feeder. More specifically, if the gob feeder has any operational faults in at least one of the operational factors including a glass temperature, a level of the molten glass basis material, a pressing depth of a feeder tube in the molten glass, a height of a feeder plunger, advancing and retracting speeds and/or strokes of the feeder plunger, an operation timing and/or a tension of shear blades, an overlapping amount and/or a temperature of the shear blades, and a position of a drop guide, such the operational fault causes any quality defects of the glass gob in at least one of a volume, a weight, a surface shape, a length, a thickness, an angle in a falling direction, and a cut surface shape thereof.

In accordance with the present invention, measurement data relating to at least one of the volume, the weight, the surface shape, the length, the thickness, the angle in the falling direction, and the cut surface shape of the glass gob is produced based on three-dimensional coordinates data.

The measurement data accounts for the setting of the operational factors. By comparing the measurement data with quality standard data of a normal glass gob as desired, the quality defect of the glass gob is detected and the faulty state of the operational factor having a causal relationship to the quality defect is identified. As a result, the setting of the identified operational factor is easily corrected so that the quality of the glass gob may always be maintained at a high precision level. This contributes to a high-quality and reliable formation of the glass product in a subsequent process step.

In accordance with the present invention, a variety of determination results are output as an alarm or warning signal. Alarm means alerts an operator to various pieces of information. Alternatively, the determination results may be input to control drive means which automatically controls the setting of the operational factors for automatic correction.

In accordance with the present invention, a plurality of CCD cameras constitutes optical observing means. When observation is required, in other words, when the glass gob is falling from the gob feeder, the CCD cameras operate in response. The measurement data is produced for each individual of the glass gobs which are successively supplied from the gob feeder at intervals.

In accordance with a first aspect of the present invention, a quality control method for a glass gob is provided in the formation process of a glass product in which a feeder mechanism pushes a column-like molten glass out through an orifice and cuts it into a glass gob to fall with gravity thereof from the orifice, and the fallen glass gob is delivered to a next position to form a predetermined glass product. The quality control method includes a three-dimensional data producing step for generating three-dimensional coordinates data of the entire surface of the glass gob by observing the glass gob in its falling position by a plurality of optical observing means spaced apart from each other; a measurement data producing step for generating, based on the three-dimensional coordinates data, measurement data relating to at least one of a volume, a weight, a surface shape, a length, a thickness, an angle in a falling direction, and a cut surface shape of the glass gob; and a defect detecting step for detecting the presence or absence of a defect in the quality of the glass gob by comparing the measurement data with quality standard data of a normal glass gob as desired.

In a second aspect of the present invention, a quality control method for a glass gob is provided in the formation process of a glass product comprising a glass gob production step in which a glass gob is produced in such a manner that molten glass is held in a container having an orifice at a bottom portion thereof, a feeder tube facing the orifice is pressed in molten glass, a feeder plunger inserted through the feeder tube advances toward the orifice to push the molten glass out through the orifice to form a column-like glass body, and shear blades cut the column-like glass body into a glass gob so that the glass gob falls with the weight thereof through a drop guide; a glass gob delivery step for receiving the fallen glass gob in a scoop funnel and for delivering the glass gob to a predetermined position; and a molding step for forming a glass product in which the delivered glass gob is introduced into a mold to be formed into a predetermined shape. The quality control method includes a three-dimensional data producing step for generating three-dimensional coordinates data of the entire surface of the glass gob by observing the glass gob, which is in a falling position between the glass gob production step and the glass gob delivery step, by a plurality of optical observing means spaced apart from each other; a measurement data producing step for generating, based on the three-dimensional coordinates data, measurement data relating to at least one of a volume, a weight, a surface shape, a length, a thickness, an angle in a falling direction, and a cut surface shape of the glass gob; a defect detecting step for detecting the presence or absence of a defect in the quality of the glass gob by comparing the measurement data with quality standard data of a normal glass gob as desired; and a cause evaluating step for assessing a causal relationship between at least one of operational factors of the gob feeder including a glass temperature in the container, the level of the molten glass, a pressing depth of the feeder tube in the molten glass, a height of the feeder plunger, advancing and retracting speeds and/or strokes of the feeder plunger, an operation timing and/or a tension of the shear blades, an overlapping amount and/or a temperature of the shear blades, and a position of the drop guide, and the quality defect detected in the defect detecting step to identify at least one faulty operational factor to be corrected; and a control driving step for automatically correcting the operational factor having the causal relationship to the quality defect of the glass gob based on the identification result provided in the cause evaluating step.

Furthermore, the cause evaluating step includes checking the quality defect data obtained through the defect detecting step by comparing the defect data with cause criterion data that identifies the causal relationship between a sort of the glass gob quality defect and the operational factors causing such quality defect, then presumably specifying the operational factors having the causal relationship with the quality defect detected in the glass gob.

Furthermore, the quality control method further includes an operational factor ranking determining step for determining the priority rank of the operational factors to be controlled for defect correction, by checking the evaluated data including a plurality of operational factors specified in the cause evaluating step with reference to priority ranking data in which various operational factors are prioritized in the rank from a high probability to a low probability depending on the type of quality defect occurred.

Furthermore, the defect detecting step and/or the control driving step may provide an alarm indicating a fault.

To perform the above-referenced quality control method, in accordance with the present invention, a quality control apparatus for a glass gob is provided in the formation process of a glass product in which a feeder mechanism pushes a column-like molten glass out through an orifice and cuts it into a glass gob to fall with gravity thereof from the orifice, and the fallen glass gob is delivered to a next position to form a predetermined glass product. The apparatus comprises a plurality of optical observing means spaced apart from each other for observation of the falling glass gob; three-dimensional data producing means for generating three-dimensional coordinates data of the entire surface of the observed glass gob; measurement data producing means for generating, based on the three-dimensional coordinates data, measurement data relating to at least one of a volume, a weight, a surface shape, a length, a thickness, an angle in a falling direction, and a cut surface shape of the glass gob; and defect detecting means for detecting a defect in the quality of the glass gob by comparing the measurement data with quality standard data of a normal glass gob as desired.

The quality control apparatus of the present invention may include cause evaluating means for assessing a causal relationship between at least one of the operational factors of the feeder mechanism and the glass gob quality defects detected by the defecting means to identify at least one operational factor which may have potential faults to be corrected.

The quality control apparatus of the present invention may include control drive means for automatically correcting an operational factor having the causal relationship to the quality defect of the glass gob according to the identification result provided by the cause evaluating means.

The quality control apparatus of the present invention may include alarm means for providing an alarm indicating a fault in cooperation with the defect detecting means and/or the control drive means.

BRIEF DESCRIPTION OF THE DRAWINGS

FIGS. 2(A)-2(D) illustrate a gob feeder, wherein FIG. 2(A) is a sectional view illustrating the state prior to the formation of a glass gob; FIG. 2(B) is a sectional view illustrating the state in which a molten glass column-like body is formed with a feeder plunger pushing; FIG. 2(C) is a sectional view illustrating the state cutting the column-like body; and FIG. 2(D) is a sectional view illustrating the state in which a glass gob is falling after cut by shear blades.

DETAILED DESCRIPTION OF THE INVENTION

Figure 1:
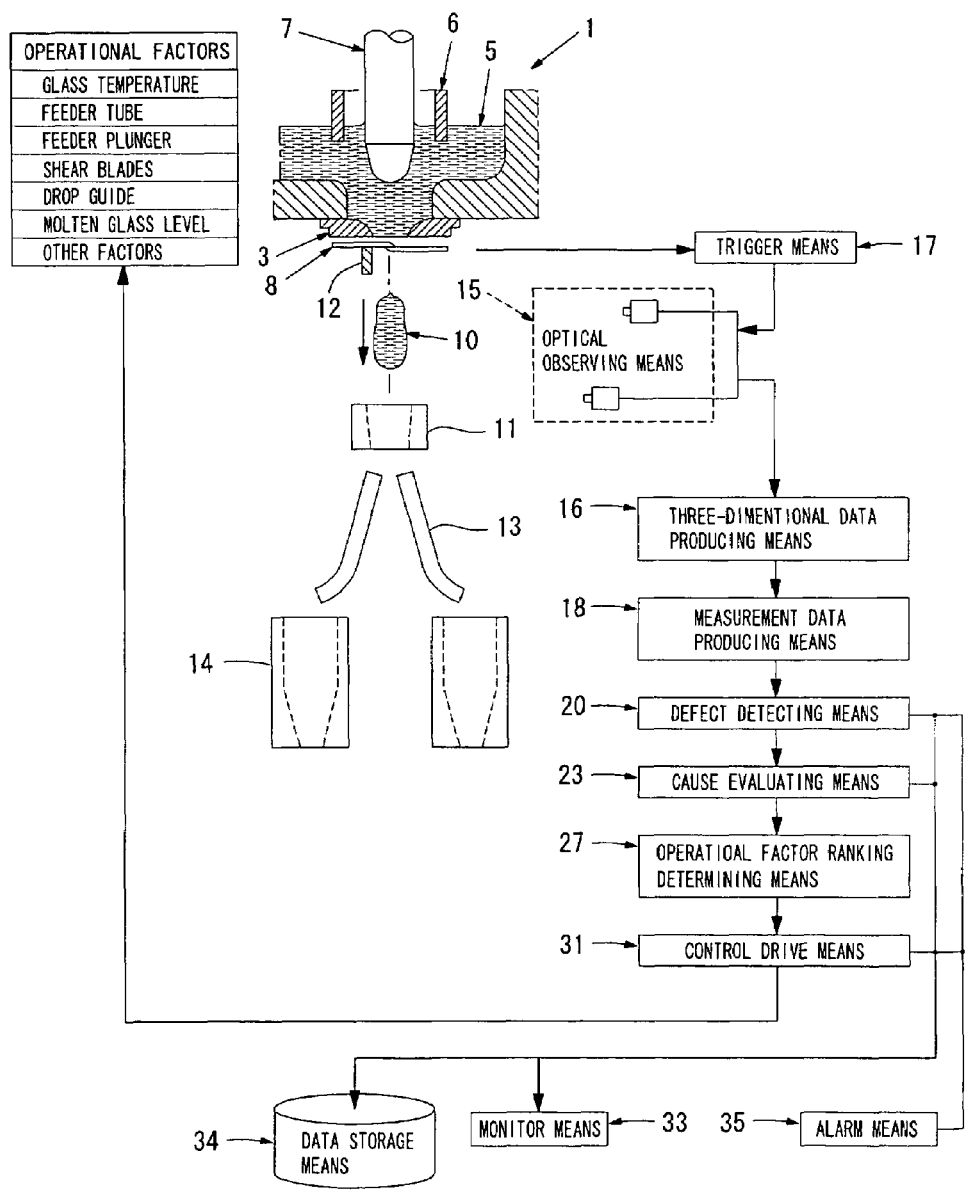
FIG. 1 is a block diagram illustrating an embodiment of the present invention.

The embodiment of the present invention is now disclosed with reference to the drawings. The embodiment to be discussed here relates to a molding method of a glass bottle. It should be noted that the present invention may also relate to a molding method of glass tableware, glass vases, glass optical elements, cathode-ray tubes, and any other glass products into which glass gobs are molded.

One method of producing glass gobs by a gob feeder as a feeder mechanism will now be described with reference to FIG. 2. As shown, a gob feeder 1 holds molten glass 5 in a container 4 having an orifice 3 at an opening 2 in the bottom thereof. A feeder tube 6 is pressed into the molten glass 5 toward the orifice 3. A feeder plunger 7, which is driven in the directions of advancing and retracting, is inserted through the feeder tube 6. Arranged right below the orifice 3 are shear blades 8 that are scissors-like cutting edges. The shear blades 8 are cooled by a mist of cooling liquid.

Before producing the glass gob, the molten glass 5 is adjusted in temperature to within a predetermined temperature range (from 1100 to 1200° C., for example) to have a predetermined viscosity. The pressing depth (height H) of the feeder tube 6 in the molten glass 5 is adjusted, a stroke of and height positions (an upper dead limit U and a lower dead limit L) of the feeder plunger 7 are also adjusted. An operation timing of the shear blades 8 is adjusted. A drop guide 12 having a half cylindrical form arranged below the shear blades 8 is adjusted in position.

FIG. 2(A) illustrates the state of the gob feeder in which the gob feeder is ready for gob production with the above-mentioned adjustments completed. The molten glass 5 is going to drop down through the orifice 3 with its own weight. In this state, the feeder plunger 7 is positioned at the upper dead limit U, and the shear blades 8 are opened.

When the glass gob is produced, the feeder plunger 7 is advanced toward the orifice 3 as shown in FIG. 2(B). Pushing the molten glass 5 out through the orifice 3, a column-like body 9 is formed. The shear blades 8 then start moving to cut the column-like body 9.

When the feeder plunger 7 reaches the lower dead limit L and then starts rising as shown in FIG. 2(C), the shear blades 8 join to be overlapped with each other and thereby cutting the column-like body 9. The drop guide 12 controls the posture of the column-like body 9 during the cutting operation.

When the shear blades 8 cut the column-like body 9 into the glass gob 10 having a predetermined volume and configuration, the glass gob 10 then falls with the weight thereof from the gob feeder 1. The molten glass 5 having the cut end thereof is drawn up into the orifice 3 as the feeder plunger 7 is raised.

The configuration of the glass gob 10 is generally determined by adjusting the timing at which the column-like body 9 is cut by the shear blades 8 in synchronization with an alternating motion of the molten glass 5 between push-out and draw-in. The posture of the glass gob 10 in the falling direction thereof is determined by moving the drop guide 12 in adjustment to the right or left and/or front or rear with respect to the column-like body 9. The volume (weight) of the glass gob 10 subsequent to the cutting operation is determined by adjusting the level (amount) of molten glass 5 flowing toward the orifice 3. The amount of molten glass 5 flowing toward the orifice 3 is determined by adjusting a height position H of the feeder tube 6.

The volume (weight) of the glass gob 10 and the configuration of the glass gob 10 including the surface shape, the thickness and the length thereof are determined not only by the operation timing of the shear blades 8 and/or the height position H of the feeder tube 6, but also by other determining factors (operational factors) such as the level of the molten glass, the temperature (viscosity) of the molten glass 5 in the gob feeder, and either the height, the advance and retraction speeds, or the advance and retraction strokes of the feeder plunger 7.

The shape of the cut surface 10a of the glass gob 10 is determined by determining factors (operational factors) such as the temperature, the tension and/or the overlap amount of the shear blades 8. The angle of the glass gob 10 in the falling state thereof (the angle of the glass gob 10 with respect to the vertical line V, namely, the falling angle of the glass gob 10) subsequent to the cutting operation depends on variations in the weight of the gob. The weight adjustment of the glass gob and the position of the drop guide 12 arranged adjacent to the shear blades 8 become determining factors (operational factors) of the falling angle of the glass gob 10.

As shown in FIG. 1, the fallen glass gob 10 is then received in the scoop funnel 11 and is then delivered to a predetermined position. After passing through the scoop funnel 11, the glass gob 10 is typically delivered to a blank mold 14 through delivery means 13, such as troughs or a deflector. The glass gob 10 is then introduced into the blank mold 14. After the above-referenced glass gob supplying step, the molding process to a finished product includes a blank step and a finishing step (not shown) when a glass bottle is produced for example.

An embodiment of the present invention is now described with reference to FIG. 1. After being cut by the shear blades 8, the glass gob 10 falls from the orifice 3. During the falling process of the glass gob 10 prior to reaching at the scoop funnel 11, the glass gob 10 is observed by the optical observing means 15. The purpose of the optical observing means 15 is to observe the entire image of the glass gob 10, and the optical observing means 15 includes at least two, preferably three or more CCD cameras spaced apart from each other. The optical observing means 15 has a view field covering spatial area extending from the top edge of the scoop funnel 11 to the shear blades 8. A plurality of CCD cameras is preferably installed at regular intervals in the same plane. The installation position of the CCD cameras is not limited to any particular location. As long as the view field of the CCD cameras covers the spatial area extending from the top edge of the scoop funnel 11 to the shear blades 8, the optical observing means 15 may be installed at any location taking into consideration the layout of other manufacturing apparatuses in a plant. Optical scanning means with laser beams or other light beams scanning the surface of the glass gob 10 may be used instead of the CCD camera. The CCD cameras provide the advantage of simultaneously capturing the entire image of the falling glass gob 10.

Three-dimensional data producing means 16 generates three-dimensional coordinates data of the entire surface of the glass gob 10 by processing the observed data obtained by the optical observing means 15. If the optical observing means are CCD cameras, a video captured by the plurality of CCD cameras is video processed by using the three-dimensional measurement technique. Fine three-dimensional coordinates data is thus obtained. Techniques for generating the three-dimensional coordinates data of the entire surface of an object, based on the image of the object from the CCD cameras, are known (Reference is made, for example, to Japanese Patent Application Publication No. 11-118438, Japanese Patent Application Publication 11-160021, etc.).

The gob feeder 1 feeds the glass gobs 10 successively with intervals therebetween. Trigger means 17 is arranged to input a trigger signal to the CCD camera in synchronization with the falling of each glass gob 10. The trigger means 17 is drivingly connected to the feeder plunger 7 or the shear blades 8 so that the trigger signal is output at the timing at which the glass gob 10 is detached by the shear blades 8. The three-dimensional data producing means 16 thus generates the three-dimensional coordinates data for each individual of the glass gobs 10.

Measurement data producing means 18 generates measurement data 19 of the glass gob 10 based on the three-dimensional coordinates data. The measurement data 19 contains all of or at least one of the volume, the weight, the surface shape, the length, the thickness, the drop position, and the falling angle of the glass gob 10, and the shape of the cut surface 10a. The volume of the glass gob 10 is mathematically calculated from the three-dimensional coordinates data. The weight of the glass gob 10 is calculated from the volume thereof based on the specific gravity of the glass gob 10. The surface shape, the length, and the thickness of the glass gob 10 and the shape of the cut surface 10a are expressed by predetermined equations based on the three-dimensional coordinates data. The drop position and the falling angle of the glass gob 10 are expressed in three-dimensional coordinates. The purposes of the generation of the measurement data 19 is to determine whether the observed glass gob 10 falls within a predetermined quality range. If the glass gob 10 is determined as defective in quality, the measurement data 19 is used to determine a faulty state of an operational factor having a causal relationship to the quality defect and to control the operational factor. The present invention is not limited to the above-mentioned measurement data. Any data may be used as the measurement data as long as the data is related to the quality of the glass gob 10 associated with the operational factor.

Figure 3:
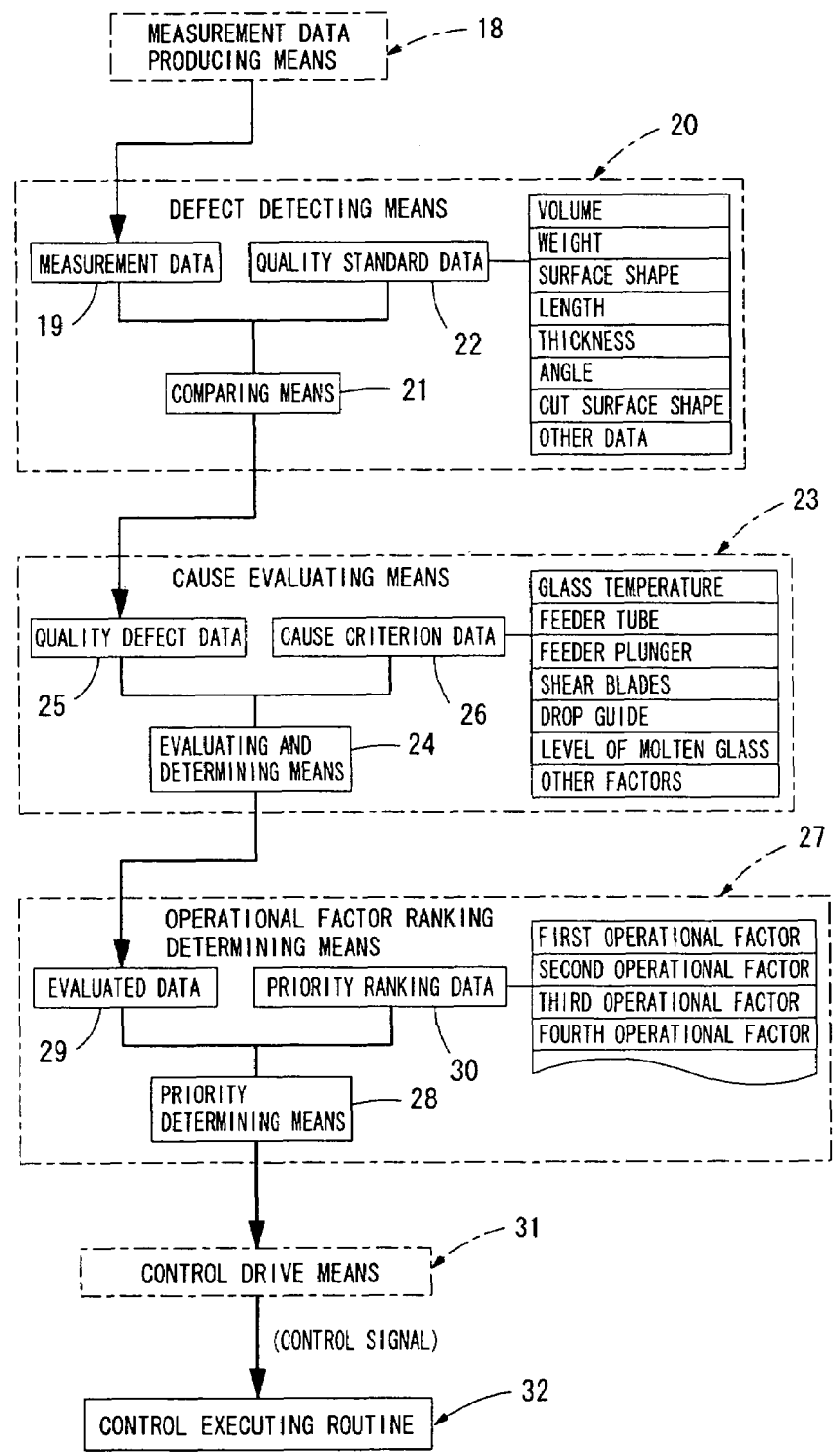
FIG. 3 is a block diagram illustrating an embodiment of and relationship of defect detecting means, cause evaluating means, and operational factor ranking determining means in accordance with the present invention.

The measurement data 19 thus generated is evaluated by defect detecting means 20. In an embodiment illustrated in FIG. 3, comparing means 21 such as a comparator circuit compares the measurement data 19 provided by the measurement data generating means 18 with quality standard data 22 that has been produced beforehand from a standard quality glass gob as desired. The comparing means 21 thus determines whether each of the measurement data falls within a permissible range. If the measurement data falls within the permissible range, the glass gob 10 is determined as being normal, and if the measurement data falls outside the permissible range, the glass gob 10 is determined as being defective. The volume, the weight, the surface shape, the length, the thickness, and the falling angle of the glass gob 10, the shape of the cut surface, and other data contained in the measurement data 19 are mutually compared with respective data contained in the quality standard data 22, and it is then determined whether the glass gob 10 falls within a predetermined quality range, in other words, it is determined whether a quality defect outside a permissible range is contained.

If it is determined that the glass gob 10 is defective in quality, cause evaluating means 23 assesses the cause of the quality defect, namely, an operational factor having a causal relationship to the quality defect. In the embodiment shown in FIG. 3, evaluating and determining means 24 checks quality defect data 25 provided by the defect detecting means 20 with reference to cause criterion data 26 produced beforehand, thereby specifying all operational factors having a possible cause for the quality defect. The cause criterion data 26 contains a variety of measurement data concerning the quality defects of the glass gob, and information relating to the causal relationship with the operational factors. The causal relationship between the quality defect of the glass gob 10 determined based on the measurement data 19 and the operational factor becoming the cause for the such quality defect is to be determined by a variety of conditions, and is difficult to describe in a simple way. The cause criterion data 26 is produced based on know-how accumulated through a great deal of experiences. The cause evaluating means 23 identifies all operational factors having the causal relationships with the quality defects of the glass gob 10.

If any operational factors are specified by the cause evaluating means 23, operational factor ranking determining means 27 prioritizes all the identified operational factors according to the probability of becoming the cause of the quality defect from high to low. In the embodiment shown in FIG. 3, priority determining means 28 checks evaluated data 29 provided by the cause evaluating means 23 with priority ranking data 30 produced beforehand, thereby prioritizing the operational factors contained in the evaluated data 29. The causes of the quality defect of the glass gob 10 may be sometimes singular, but may be typically a combination of operational factors. To identify a true cause of the quality defect, a plurality of operational factors need to be examined. The priority ranking data 30 is produced based on much know-how accumulated through a great deal of experiences, and contains data of all operational factors having the causal relationship with a particular type of quality defect and being prioritized in the rank from high probability to low probability in the causal relationship.

Figure 4:
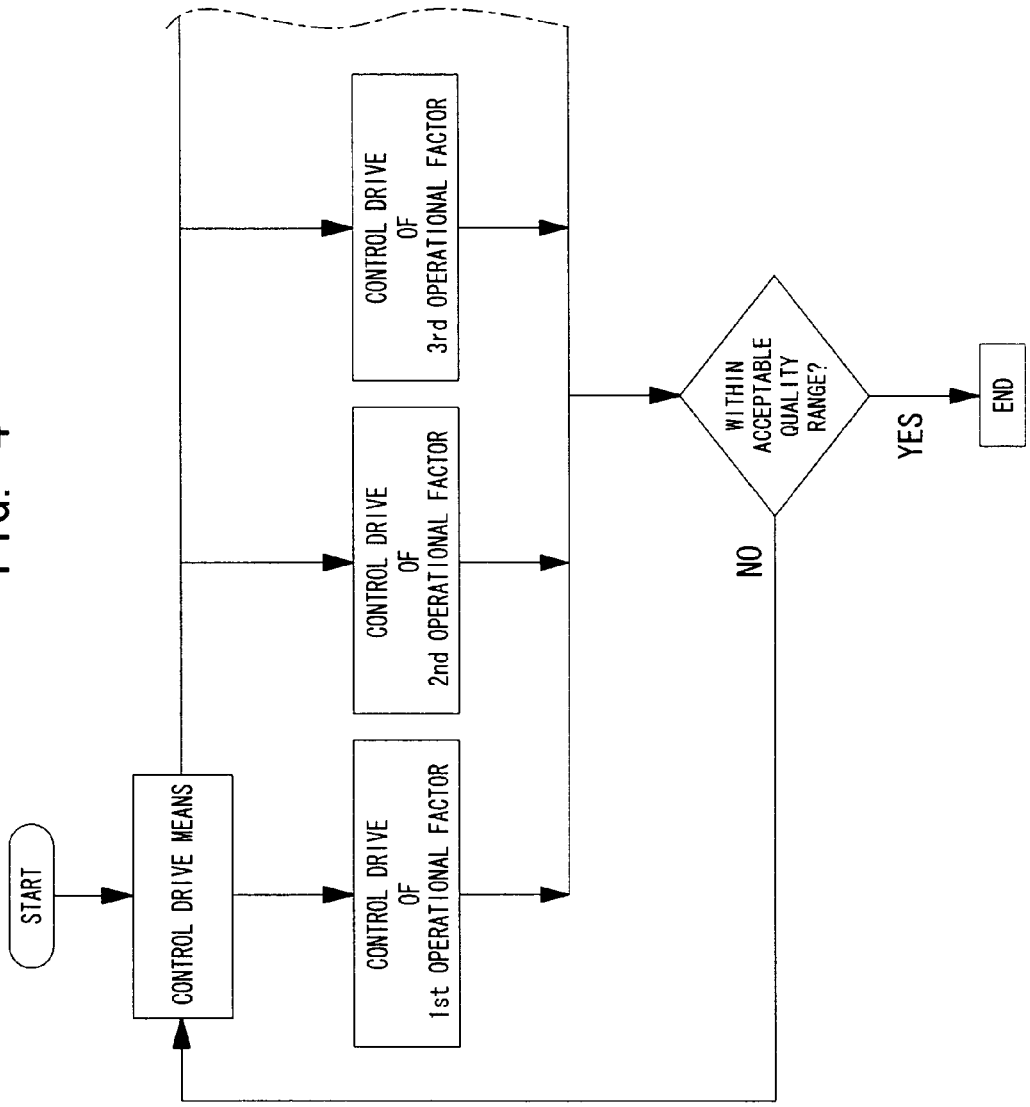
FIG. 4 is a flow chart illustrating one example of a control executing routine in accordance with the present invention.

When the operational factor ranking determining means 27 determines the priority rank of the causal operational factors to be corrected, control drive means 31 is driven to perform a control executing routine 32 to adjust and correct the operational factors in accordance with the determined priority rank. As shown in FIG. 4, the control executing routine 32 sends a control signal to an operational factor with a first priority, thereby automatically controlling the operational factor and adjusting the quality of the glass gob to within the permissible range of the quality standard data 22. After the adjustment, the optical observing means 15 observes a new glass gob 10 that is falling from the gob feeder 1, the measurement data 19 of the glass gob 10 is processed as mentioned above and examined by the defect detecting means 20 whether the quality of the glass gob falls within the permissible range of the quality standard data 22. If the defect detecting means 20 determines that the quality of the glass gob falls within the permissible range, the control executing routine 32 ends. If the defect detecting means 20 determines that the quality of the glass gob does not fall within the permissible range, the control drive means 31 sends the control signal again to the operational factor having the first priority for adjustment. If the defect detecting means 20 determines that the quality of the glass gob is still out of the permissible range even after these steps are repeated, the control drive means 31 sends a control signal to an operational factor having a second priority, thereby automatically controlling the operational factor concerned. All operational factors, considered as a cause for the quality defect, are successively corrected in accordance with the order of priority until the quality of the successively produced glass gobs 10 are restored back to within the permissible range of the quality standard data 22.

In the adjustment of the operational factors, for example, the glass temperature (viscosity) of the molten glass 5 in the gob feeder is adjusted by controlling a heater. In the adjustment of the feeder tube 6, the height position H thereof is adjusted. In the adjustment of the feeder plunger 7, the height position, the advance and retraction speeds, and the advance and retraction strokes thereof, etc. are adjusted. In the adjustment of the shear blades 8, the tension and/or the overlap amount thereof are adjusted. Furthermore, the amount and/or the temperature of the sprayed cooling mist are also adjusted. The operation timing of the shear blades 8 may also be adjusted. If the falling angle of the glass gob 10 is inclined, or if the drop position of the glass gob 10 is deviated from the scoop funnel 11, the drop guide 12 is adjusted in position. The control adjustment of the operational factors is not limited to these adjustments mentioned above. Any adjustment may be included as necessary as long as the adjustment is related to the quality of the glass gob 10.

One process example from the detection of the quality defect of the glass gob to the control adjustment of the operational factors will now be discussed. If the defect detecting means 20 detects that the weight of a gob is above an upper limit (heavy), the cause evaluating means 23 finds the operational factors having the causal relationship with the gob weight. Referencing the cause criterion data 26, the cause evaluating means 23 determines, as the operational factors having the causal relationship with the gob weight, the pressing depth of the feeder tube in the molten glass, the height of the feeder plunger, the advance and retraction speeds and/or the advance and retraction strokes of the feeder plunger, the glass temperature in the gob feeder, the level of the molten glass, the operation timing of the shear blades, the overlapping amount of the shear blades, the tension of the shear blades, and the temperature of the shear blades. The operational factor ranking determining means 27 prioritizes the determined operational factors, and the control drive means 31 sends a control signal to each of the operational factors in accordance with the ranking order of priority. If the operational factor of the pressing depth of the feeder tube in the molten glass has a high priority with the gob weight, the control drive means 32 tries to lighten the weight of the glass gob while sending a control signal to the feeder tube to increase the feeder pressing depth. Such adjustments are repeated until the weight of the following glass gob successively produced falls within the permissible range of the quality standard data 22. If the weight of the following glass gob fails to fall within the permissible range, the control drive means 31 sends a control signal to an operational factor having a next highest priority.

As shown in FIG. 1, a plurality of or at least one of the results including the result of the measurement data 19 by the defect detecting means 20, the result of the quality defect data 25 by the cause evaluating means 23, and the result of the control executing routine 32 performed by the control drive means 31 is monitored on a display or the like of monitor means 33, also stored in data storage means 34 to be used as an experienced quality control record which forms a database for helping to produce an ideal glass gob in the future. At the same time as such data is accumulated, the quality standard data 22 and/or the cause criterion data 26 and/or the priority ranking data 30 may be updated.

If the defect detecting means 20 determines that the glass gob is defective in quality, an alarm signal is sent to alarm means 35. An alarm indicating a quality defect is thus issued to provide the operator with information of the occurrence of a quality defect of the glass gob. If the quality of the glass gobs is not improved to a normal level regardless of the adjustment of the operational factors, an alarm signal is sent to the alarm means 35 to alert the operator to a failed attempt at the automatic control of the operational factors. In such a case, wear of the shear blades 8 or the orifice 3 may be a cause, and is not corrected by the adjustment of the operational factors. The operator may need to replace these components.

The quality of the glass gobs 10 successively produced by the gob feeder 1 is maintained almost on a real-time basis by automatically controlling the operational factors. The glass product is reliably produced at a high equality level.

INDUSTRIAL APPLICABILITY

In the glass molding method of a predetermined glass product from a glass gob in accordance with the present invention, the measurement data relating to at least one of the volume, the weight, the surface shape, the length, the thickness, the falling angle, and the cut surface shape of the glass gob is produced based on the three-dimensional coordinates data. Since the measurement data accounts for the setting of the operational factors, the quality defect of the glass gob is detected by comparing the measurement data with the quality standard data. The quality defect data is checked against the cause criterion data to determine the operational factors having the causal relationship with the quality defect. As a result, the setting of the determined operational fault may be easily corrected. The quality of the glass gobs is continuously maintained at a high precision level. This arrangement contributes to the reliable production of the high-quality glass product at the next step.

In accordance with the present invention, a plurality of determined operational factors is prioritized according to the rank of priority in the correction of the operational factors.

The normal formation process of the glass gobs quickly resumes. Thus the present invention provides advantages in the yield of the glass products. In the correction of the operational factors, the control drive means outputs the control signal in response to the determination result and automatically controls the setting of the operational factors. The operational factors are thus automatically corrected, and workload on the operator is reduced.

In accordance with the present invention, a variety of determination results are output in the form of alarm signals, and the alarm means alert the operator to a variety of pieces of information.

The invention claimed is:

1. A quality control method for a glass gob in the formation of a glass product, comprising:
    a glass gob production step for producing a glass gob in which a feeder plunger is advanced through a feeder tube toward an orifice at a bottom portion of a container in a manner that said feeder tube is pressed in molten glass held in the container and facing said orifice, the molten glass is pushed out through said orifice to form a column-like glass body, and the column-like glass body is cut into glass gob by shear blades so that the glass gob falls with the weight thereof through a drop guide;
    a glass gob delivery step for receiving the fallen glass gob in a scoop funnel and for delivering the glass gob toward a predetermined position; and
    a molding step for forming a glass product in which said delivered glass gob is introduced into a mold and formed into a predetermined shape;
    wherein the quality control method further comprises:
    a three-dimensional data producing step for generating three-dimensional coordinates data of the entire surface of the glass gob by observing the glass gob, which is in a falling position between said glass gob production step and said glass gob delivery step, through a plurality of optical observing means spaced apart from each other;
    a measurement data producing step for generating, based on said three-dimensional coordinates data, measurement data relating to at least one of a volume, a weight, a surface shape, a length, a thickness, an angle in a falling direction, and a cut surface shape of the glass gob;
    a defect detecting step for detecting the presence or absence of a defect in the quality of the glass gob by comparing the measurement data with quality standard data being a selected plurality of a volume, a weight, a surface shape, a length, a thickness, an angle in a falling direction, and a cut surface shape of a normal glass gob so that quality defect data is provided when said detected defect in the quality of the glass gob is determined outside a permissible range;
    a cause evaluating step for assessing a type of the quality defect detected in said defect detecting step and identifying causal relationships between said type of the quality defect and all operational factors of the gob feeder as the cause of said type of the quality defect including a glass temperature in the container, a level of the molten glass, a pressing depth of the feeder tube in the molten glass, a height of the feeder plunger, advance and retraction speeds and/or strokes of the feeder plunger, an operation timing of the shear blades, a tension of the shear blades, an overlapping amount of the shear blades, a temperature of the shear blades and a position of the drop guide, by checking said quality defect data with reference to cause criterion data which contains information of causal relationships between types of the quality defects and the operational factors;
    an operational factor ranking determining step for determining the priority rank of the operational factors to be controlled for fault correction, by checking evaluated data including a plurality of the operational factors specified in said cause evaluating step with reference to priority ranking data of the operational factors that are prioritized in the rank from a high probability to a low probability depending on the type of the quality defect occurred; and
    a control driving step for automatically correcting the operational factors in accordance with the priority rank determined in said operational factor ranking determining step;
    wherein said cause evaluating step comprises checking the quality defect data obtained through said defect detecting step by comparing the defect data with cause criterion data that identifies the causal relationship between the type of the quality defect of the glass gob and the operational factor as the cause of the quality defect; and
    wherein said control driving step performs a control executing routine in which the operational factors are successively controlled for adjustment in accordance with the order of priority until the measurement data of the successively produced glass gobs are restored back to within the permissible range of the quality standard data; and
    wherein the method further comprises an updating step for storing a plurality of or at least one of the results including the result of said defect detecting step, the result of said cause evaluating step, and the result of said control driving step is stored to be used as experienced quality control record, and whereby said quality standard data and/or said cause criterion data and/or said priority ranking data is updated.

2. A quality control apparatus for a glass gob in the formation of a glass product, having a feeder mechanism that cuts a column-like molten glass pushed out through an orifice thereof into a glass gob and allows each glass gob to fall with gravity from the orifice, and forming a predetermined glass product from the glass gob after delivering the fallen glass gob to a predetermined position, comprising:
    a plurality of optical observing means spaced apart from each other for observing the falling glass gob,
    three-dimensional data producing means for generating three-dimensional coordinates data of the entire surface of the observed glass gob,
    measurement data producing means for generating, based on said three-dimensional coordinates data, measurement data relating to at least one of a volume, a weight, a surface shape, a length, a thickness, an angle in a falling direction, and a cut surface shape of said glass gob;
    defect detecting means for detecting a defect in the quality of said glass gob by comparing said measurement data with quality standard data being a selected plurality of a volume, a weight, a surface shape, a length, a thickness, an angle in a falling direction, and a cut surface shape of a normal glass gob so that quality defect data is provided when said detected defect in the quality of the glass gob is determined outside a permissible range;
    cause evaluating means for assessing the type of the quality defect detected by said defect detecting means and identifying causal relationships between said type of the quality defect and all operational factors of the feeder mechanism as the cause of said type of the quality defect including a glass temperature in the container, a level of the molten glass, a pressing depth of the feeder tube in the molten glass, a height of the feeder plunger, advance and retraction speeds and/or strokes of the feeder plunger, an operation timing of the shear blades, a tension of the shear blades, an overlapping amount of the shear blades, a temperature of the shear blades and a position of the drop guide, by checking said quality defect data with reference to cause criterion data which contains information of causal relationships between types of the quality defects and the operational factors;

operational factor ranking determining means for determining the priority rank of the operational factors to be controlled for fault correction, by checking evaluated data including a plurality of the operational factors specified by said cause evaluating means with reference to priority ranking data of the operational factors that are prioritized in the rank from a high probability to a low probability depending on the type of the quality defect occurred; and control driving means for automatically correcting the operational factors in accordance with the priority rank determined by said operational factor ranking determining means;

wherein said control driving means performs a control executing routine in which the operational factors are successively controlled for adjustment in accordance with the order of priority until the measurement data of the successively produced glass gobs are restored back to within the permissible range of the quality standard data; and wherein the apparatus further comprises updating means for storing a plurality of or at least one of the results including the result by said defect detecting means, the result by said cause evaluating means, and the result by said control driving means to use as experienced quality control record, and whereby said quality standard data and/or said cause criterion data and/or said priority ranking data is updated.

* * * * *